United States Patent
Scholz et al.

(10) Patent No.: US 6,568,275 B2
(45) Date of Patent: May 27, 2003

(54) CAPACITIVE DIFFERENTIAL PRESSURE SENSOR

(75) Inventors: Wolfgang Scholz, Minden (DE); Albrecht Vogel, Stutensee (DE); Peter Krippner, Karlsruhe (DE); Dieter Binz, Hirschberg (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 10/172,275

(22) Filed: Jun. 14, 2002

(65) Prior Publication Data

US 2002/0194921 A1 Dec. 26, 2002

(30) Foreign Application Priority Data

Jun. 23, 2001 (GB) .............................. 101 30 373

(51) Int. Cl.[7] .................................................. G01L 9/12
(52) U.S. Cl. ...................................................... 73/718
(58) Field of Search .......................... 73/706, 718, 724; 361/283.1, 283.2, 283.3, 283.4; 156/272.2, 273.1

(56) References Cited

U.S. PATENT DOCUMENTS 5,207,103 A * 5/1993 Wise et al. .................... 73/724
5,695,590 A * 12/1997 Willcox et al. .......... 156/272.2
5,804,736 A * 9/1998 Klauder et al. ................ 73/724

* cited by examiner

*Primary Examiner*—William Oen
(74) *Attorney, Agent, or Firm*—Michael M. Rickin, Esq.

(57) ABSTRACT

There is described a capacitive differential pressure sensor made using glass-silicon technology with a diaphragm plate of silicon, which is arranged between two carrier plates consisting of glass. The diaphragm plate has pressure-sensitively deflectable regions, which are respectively provided with a capacitor arrangement. The capacitor arrangement is connected to a measured-value processing device through connecting conductors. To improve the ratio of the measuring capacitances to the parasitic capacitances brought about by the connecting conductors, the diaphragm plate is outside the pressure-sensitively deflectable region the substrate of an electronic circuit which comprises at least one input stage of the measured-value processing device.

3 Claims, 2 Drawing Sheets

CAPACITIVE DIFFERENTIAL PRESSURE SENSOR

1. FIELD OF THE INVENTION

The invention relates to a capacitive differential pressure sensor made using glass-silicon technology for industrial applications.

2. DESCRIPTION OF THE PRIOR ART

DE 42 07 949 discloses a capacitive differential pressure sensor made using glass-silicon technology in which a plate of silicon, serving as a pressure-sensitive diaphragm and as a first electrode, is arranged between two carrier plates consisting of glass, the plate and the carrier plate being integrally connected to one another in their edge region by anodic bonding in such a way that in each case a carrier plate combines with the plate serving as the diaphragm to form a measuring chamber, each carrier plate has a pressure supply duct, which runs perpendicular to the contact surfaces of the plate and of the carrier plates and via which the respective measuring chamber can be pressurized, and the surfaces of the carrier plates lying opposite the deflectable region of the plate serving as the diaphragm are each provided with a metallization, serving as a second electrode, in such a way that the first electrode and the second electrodes form a differential-pressure-dependent capacitor arrangement.

The differential-pressure-dependent deformation of the plate serving as a diaphragm brings about a change in capacitance of the capacitor arrangement, the change in capacitance being a direct measure of the differential pressure. The change in capacitance is measured electrically. The capacitor arrangement is connected to a measured-value processing device via connecting conductors.

With increasing miniaturization of such capacitive differential pressure sensors, the ratio of the measuring capacitances of the capacitor arrangement to the parasitic capacitances of the connecting conductors with respect to one another and with respect to reference potential deteriorates. As a consequence of this, the small change in capacitance $\Delta C_M/C_M$ at the input of the measured-value processing device, with reference to the measuring capacitances $C_M$ and representing the measured value, occurs only as a change in capacitance $\Delta C_{M/(C_M} + C_S)$ with reference to the sum of the measuring capacitance $C_M$ and parasitic capacitances $C_S$. As the ratio of the parasitic capacitances $C_S$ to the measuring capacitances $C_M$ increases, the resolution of the capacitive differential pressure sensor in a measuring range decreases.

In addition, production-related tolerances of the parasitic capacitances $C_S$ mean that a more complex procedure is required for calibrating the capacitive differential pressure sensor.

The invention is therefore based on the object of improving the ratio of the measuring capacitances to the parasitic capacitances in a capacitive differential pressure sensor of this type.

SUMMARY OF THE INVENTION

The invention proceeds from a known capacitive differential pressure sensor made using glass-silicon technology, in which a diaphragm plate of silicon, serving as a first electrode and with a pressure-sensitively deflectable region, is arranged between two carrier plates consisting of glass, the diaphragm plate and each carrier plate being integrally connected to one another in their edge region by anodic bonding in such a way that in each case a carrier plate combines with the diaphragm plate to form a measuring chamber, each carrier plate has a pressure supply duct, which runs perpendicular to the contact surfaces of the diaphragm plate and of the carrier plates and via which the respective measuring chamber can be pressurized, and the surfaces of the carrier plates lying opposite the deflectable region of the diaphragm plate are each provided with a metallization, serving as a second electrode, in such a way that the first electrode and the second electrodes form a differential-pressure-dependent capacitor arrangement. The capacitor arrangement is connected to a measured-value processing device.

The essence of the invention consists in that, outside the pressure-sensitively deflectable region, the diaphragm plate is the substrate of an electronic circuit which comprises at least one input stage of the measured-value processing device, which is connected to the capacitor arrangement and the output signal of which can be transmitted to the next-following stage of the measured-value processing device without any loss of information independently of line parameters.

The connecting conductors between the capacitor arrangement and the electronic circuit are so short in this case that the parasitic capacitances of the connecting conductors with respect to one another and with respect to reference potential are negligible in comparison with the measuring capacitance of the capacitor arrangement.

Apart from the second electrode of the measuring capacitance in each case, all the means for measured value acquisition are advantageously combined on a single component. This dispenses with the joining processes necessary in the case of a multi-part construction. In addition, production by the mask process known per se allows small tolerances of the mechanical parameters of the connecting conductors to be achieved, reducing the complexity of the procedure for calibrating the capacitive differential pressure sensor.

According to a further feature of the invention, the input stage of the measured-value processing device is a delta-sigma modulator. The output signal of the delta-sigma modulator is binary and can be transmitted to the next-following stage of the measured-value processing device without any loss of information independently of line parameters.

According to a further feature of the invention, the integration capacitor of the delta-sigma modulator is the capacitor arrangement of the capacitive differential pressure sensor. In this case, the differential pressure-dependent capacitance signal is digitized directly.

As a result, there is advantageously no longer any need for any tolerance-affected and potentially signal-falsifying analog preprocessing of the capacitance signal representing the measured value.

DESCRIPTION OF THE PREFERRED EMBODIMENT(S)

Figure 1:
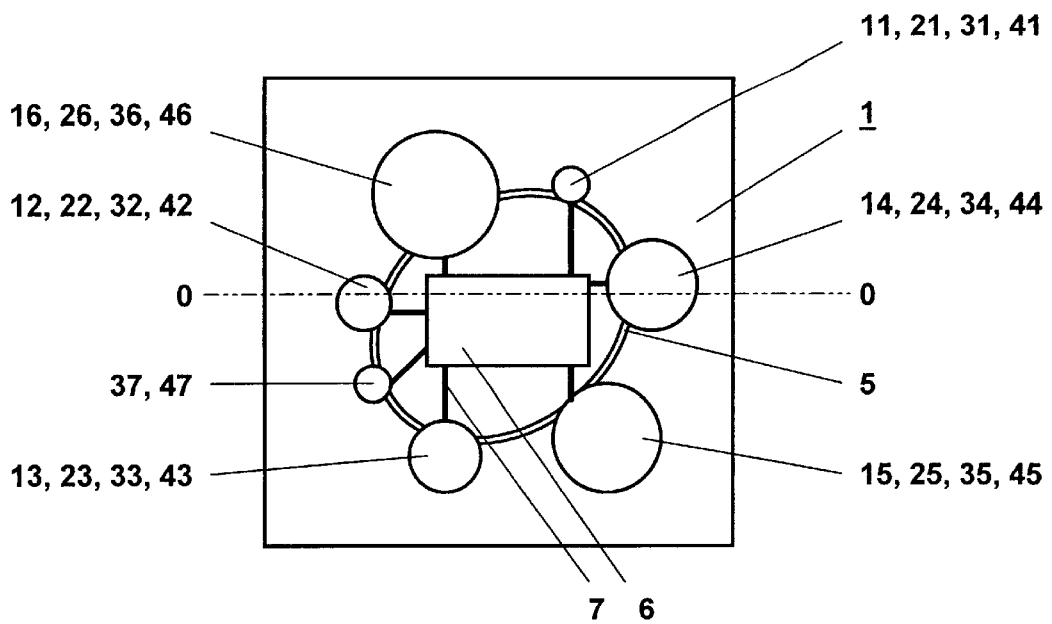
FIG. 1 shows a basic representation of the differential pressure sensor of the present invention.
Figure 2:
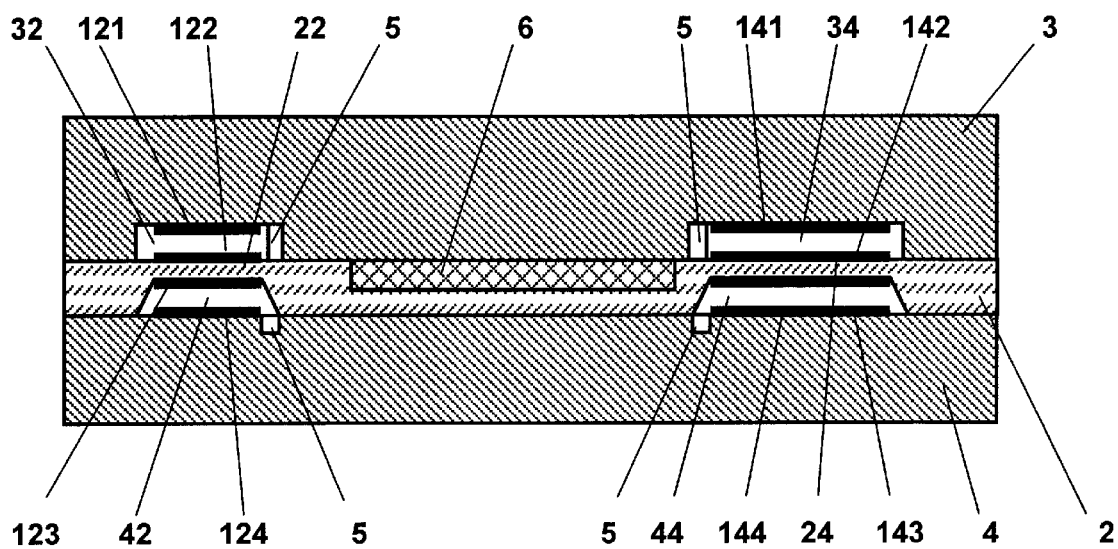
FIG. 2 shows a sectional representation along the sectional line 0—0 in FIG. 1.

In FIG. 1, the lateral construction of a differential pressure sensor 1 with six part-sensors 11 to 16 is represented in principle in a first embodiment. In FIG. 2, an enlarged sectional representation along the sectional line 0—0 in FIG. 1 is shown. Hereafter, reference is made simultaneously to FIGS. 1 and 2.

The differential pressure sensor 1 essentially comprises a diaphragm plate 2 of silicon, which is arranged between two carrier plates 3 and 4 consisting of glass, the diaphragm plate 2 and each carrier plate 3 and 4 being integrally connected to one another in their edge region by anodic bonding in such a way that in each case a carrier plate 3 and 4 combines with the diaphragm plate 2 to form a measuring chamber 30 and 40, respectively.

Each carrier plate 3, 4 has an eccentrically arranged pressure supply duct 37, 47, which runs perpendicular to the plane of the contact surfaces of the diaphragm plate 2 and of the carrier plates 3, 4 and to which in each case a capillary 5 designed as a ring line is connected. The capillaries 5 are passed through sectors 31 to 36 and 41 to 46. With reference to the plane of the diaphragm plate 2, a sector 31 to 36 adjoining the carrier plate 3 and a sector 41 to 46 adjoining the carrier plate 4 are respectively arranged congruently as a related pair of sectors 31/41 to 36/46.

In a corresponding way, the measuring chamber 30 limited by the carrier plate 3 is divided into six sectors 31 to 36 and one annular capillary 5, connected to the pressure supply duct 37. The measuring chamber 40 limited by the carrier plate 4 is divided into six sectors 41 to 46 and one annular capillary 5, connected to the pressure supply duct 47.

The diaphragm plate 2 is designed in the region of congruence of each pair of sectors 31/41 to 36/46 as a pressure-sensitively deflectable measuring diaphragm 21 to 26. A pair of sectors 31/41 to 36/46 and the associated measuring diaphragm 21 to 26 respectively form one of the six part-sensors 11 to 16.

The part-sensors 11 to 16 are distributed in a star-shaped manner in the differential pressure sensor 1. Each part-sensor 11 to 16 is assigned a total of four electrodes for sensing the pressure-dependent deflection of its measuring diaphragm 21 to 26. Represented in FIG. 2 for the part-sensors 12 and 14 are the associated electrodes 121 to 124 and 141 to 144, which are formed as thin metallization layers. For each part-sensor 12 and 14, one of the electrodes 121 and 141 is respectively attached to the carrier plate 3 and one of the electrodes 124 and 144 is respectively attached to the carrier plate 4. The electrodes 122 and 142 are arranged on the side of the measuring diaphragms 22 and 24 facing the carrier plate 3 and the electrodes 123 and 143 are arranged on the side of the measuring diaphragms 22 and 24 facing the carrier plate 4.

The pairs of electrodes 121/122, 123/124 and 141/142 and 143/144 arranged in the same sector 32, 42, 34 and 44 respectively form a capacitor, the capacitance ratio of the capacitors of the same part-sensor 12 and 14 being a measure of the difference between the pressures in the measuring chambers 30 and 40.

Outside the measuring diaphragm 21 to 26, the diaphragm plate 2 is the substrate of an electronic circuit 6, which comprises at least one input stage of a measured-value processing device. The electronic circuit 6 is connected via connecting conductors 7 to the pairs of electrodes 121/122, 123/124 and 141/142 and 143/144 of each part-sensor 11 to 16, respectively forming a capacitor.

The electronic circuit 6 is preferably arranged centrally between the part-sensors 11 to 16. This advantageously produces short lengths, and consequently low parasitic capacitances, for all the connecting conductors 7.

Figure 3:
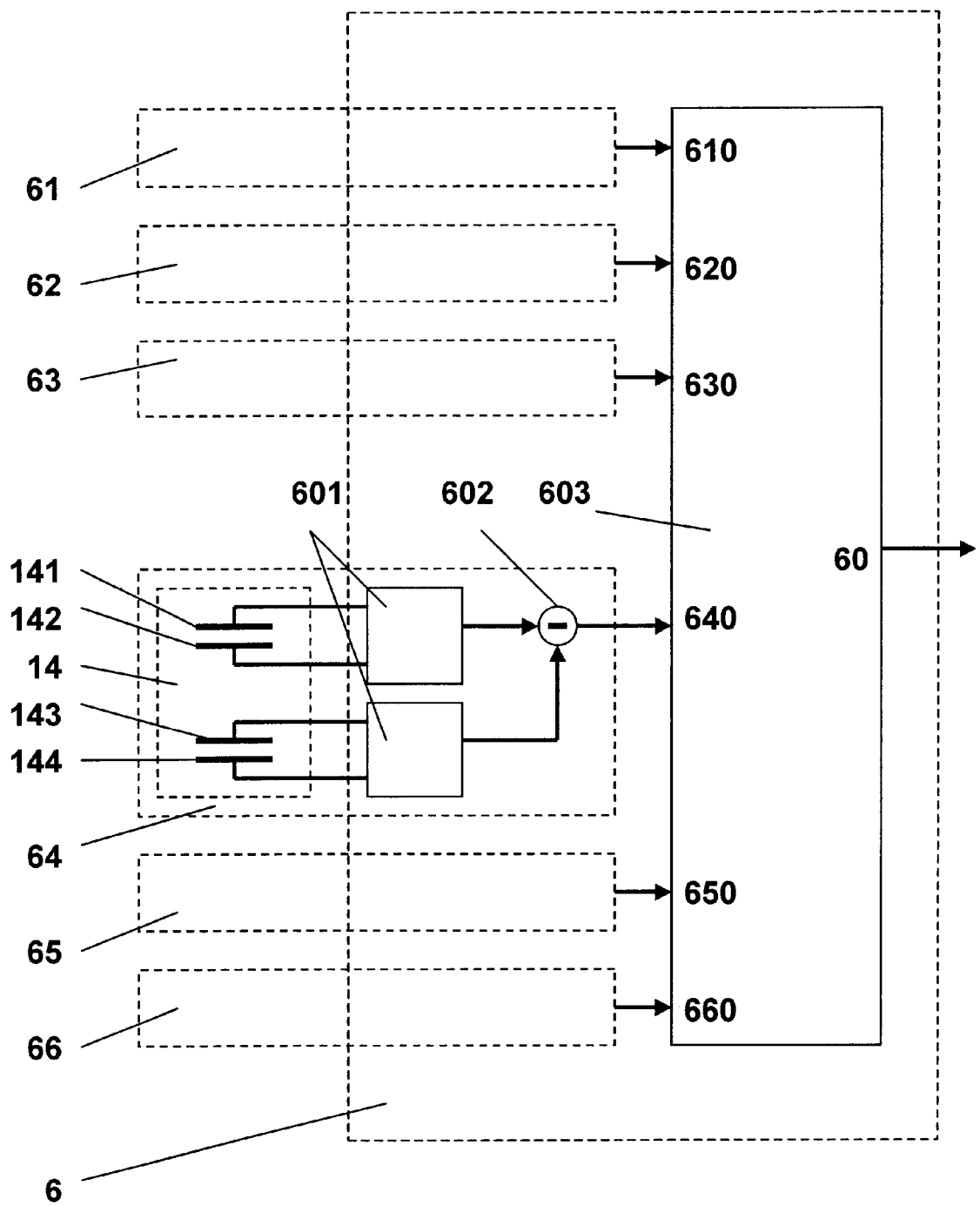
FIG. 3 shows a basic representation of an electronic circuit for measured value processing.

The capacitance ratios are evaluated separately by electronic means for each part-sensor 11 to 16. In FIG. 3, an electronic circuit for the measured value processing is represented in principle. The wiring of the capacitor arrangement of the part-sensor 14 is shown in detail here.

The pairs of electrodes 141/142 and 143/144 belonging to the part-sensor 14 are respectively connected to a delta-sigma modulator 601 known per se. Delta-sigma modulators 601 of this type are suitable for converting an analog input voltage into a binary pulse-width-modulated signal, the pulse width of which is proportional to the analog input voltage in dependence on the time-determining capacitance of an integration capacitor.

For sampling the differential-pressure-dependent capacitance of the pairs of electrodes 141/142 and 143/144 of the part-sensor 14, respectively forming a capacitor, the input voltage of each delta-sigma modulator 601 is kept constant and one of the pairs of electrodes 141/142 and 143/144 is connected in each case in place of the integration capacitor. As a result, the differential-pressure-dependent capacitance signal is Advantageously digitized directly.

The outputs of the delta-sigma modulators 601 belonging to the part-sensor 14 are brought together at a subtraction point 602. The interconnection of two delta-sigma modulators 601 and a subtraction point 602 of the same part-sensor 14 is referred to as input stage 64. The input stages 61 to 63 and also 65 and 66, symbolized in FIG. 3, have the same construction for the part-sensors 11 to 13 and also 15 and 16 as the input stage 64 of the part-sensor 14. At the output of each input stage 61 to 66, a part-sensor differential pressure signal 610 to 660 of the respective part-sensor 11 to 16 can be picked off.

According to the invention, it is provided that the electronic circuit 6 realized on the diaphragm plate 2 comprises at least the input stages 61 to 66 of the part-sensors 11 to 16.

In an extended refinement of the invention, the electronic circuit 6 realized on the diaphragm plate 2 additionally comprises a signal connection 603. The signal connection 603 has six inputs and one output. The inputs are wired to the part-sensor differential pressure signals 610 to 660. At the output, the differential pressure signal 60 of the differential pressure sensor 1 can be picked off.

The interconnection of the input stages 61 to 66 and the signal connection 603 forms the measured-value processing device 6.

The measured values of the part-sensors 11 to 16 are checked for plausibility by the signal connection 603 and brought together to form a differential pressure signal 6 for the differential pressure sensor 1.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A capacitive differential pressure sensor comprising:
   a. two glass carrier plates; and
   b. a diaphragm plate of silicon serving as a first electrode and with a pressure-sensitively deflectable region arranged between said two carrier plates;
      said diaphragm plate and each carrier plate being integrally connected to one another in their edge region by anodic bonding such that each of said two carrier plates combine with said diaphragm plate to form a measuring chamber, each of said carrier plates having a pressure supply duct, which runs perpendicular to the contact surfaces of said diaphragm plate and of said carrier plates and through which the respective measuring chamber can be pressurized, the surfaces of said carrier plates lying adjacent said deflectable region of said diaphragm plate forming a first electrode and said surfaces of said carrier plates lying opposite the deflectable region of the diaphragm plate are each provided with a metallization, serving as a second electrode, in such a way that the first electrode and the second electrodes form a differential-pressure-dependent capacitor arrangement said diaphragm plate outside of said pressure-sensitively deflectable region is the substrate of an electronic circuit which comprises at least one input stage of a measured-value processing device which is connected to said capacitor arrangement and the output signal of which can be transmitted to a next-following stage of said measured-value processing device electrically connected to said at least one input stage without any loss of information and independent of any parameters of said electrical connection.

2. The differential pressure sensor of claim 1 wherein said input stage of said measured-value processing device comprises a delta-sigma modulator.

3. The differential pressure sensor of claim 2 wherein said sigma-delta modulator has an integration capacitor formed by said capacitor arrangement of said differential pressure sensor.

* * * * *